United States Patent Office 2,713,062
Patented July 12, 1955

2,713,062

3-METHYL-17-ETHINYL ANDROSTANDIOLS

Karl Junkmann, Berlin, and Otto Engelfried, Berlin-Hermsdorf, Germany, assignors to Schering A. G., Berlin, Germany, a corporation of Germany No Drawing. Application July 28, 1953,
Serial No. 370,886

Claims priority, application Germany August 8, 1952

3 Claims. (Cl. 260—397.5)

This invention relates to the manufacture of therapeutically valuable alcohols of the cyclopentanopolyhydrophenanthrene series and is an improvement in or modification and further development of the invention of U. S. application Ser. No. 279,957.

U. S. application Ser. No. 279,957 describes and claims steroid compounds of the following formula

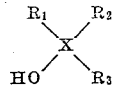

wherein X represents a steroid ring system being at least substituted by the

groups in 3-position and by the

groups in 17-position and wherein $R_1$ is a saturated or unsaturated aliphatic hydrocarbon residue, and $R_2$ and $R_3$ are substituents as follows:

(a) $R_2$ may be hydrogen when $R_3$ is a hydroxyl group or a group convertible by hydrolysis into a hydroxyl group, and (b) $R_2$ may be a saturated or unsaturated hydrocarbon side chain having 1 to 3 carbon atoms, which may contain as substituent a hydroxyl group, carbonyl group or oxide group or a group convertible by hydrolysis into the hydroxyl, carbonyl or oxide group, when $R_3$ is hydrogen, a hydroxyl group or a group convertible by hydrolysis into a hydroxyl group, or (c) $R_2$ and $R_3$ together may be a carbonyl group.

The new compounds of U. S. application Ser. No. 297,957 are stated therein to possess antihormonal activity.

The present invention is based on the observation that further new steroid compounds falling within the group claimed in specification Ser. No. 279,957 can be obtained which, also in contradistinction to the previously known steroid compounds which contain in 17-position a tertiary alcohol group, likewise possess anti-hormonal activity, that is to say possess an effect which is contrary to that of the customary sex hormones.

The compounds of the present invention have the cyclopentanopolyhydrophenanthrene structure and possess in 3-position the grouping

and in 17-position the grouping

in which $R^1$ indicates a saturated or unsaturated hydrocarbon residue and $R^2$ indicates a saturated or unsaturated hydrocarbon side chain with 1 to 3 carbon atoms.

Such compounds, preferably when $R^1$ and $R^2$ are different and especially when $R^2$ indicates an unsaturated hydrocarbon side chain, as for example ethinyl, possess a strong inhibitive effect upon the testicle growth of young male rats.

The production of the specified compounds can take place according to the invention by reaction of corresponding 3-keto compounds, which contain in 17-position the grouping

in which $R^2$ has the above significance and $R^4$ is a hydroxyl group or a group convertible into a hydroxyl group, with metal-organic compounds, as for example alkyl magnesium halides, lithium alkyls, alkali acetylides, acetylene in the presence of alkali metals or alkali metal compounds such as alkali amides, alkali alcoholates and the like. The same compounds can also be produced by starting from cyclopentanopolyhydrophenanthrene compounds which contain in 3-position the grouping

in which $R^1$ and $R^4$ have the above significance, and in 17-position a keto group, by reaction thereof with metal-organic compounds such as alkyl magnesium halides, lithium alkyls or alkali acetylides. The known methods are employed in both cases, i. e. those in actual use or described in the literature.

The latter process offers certain technical advantages. Whereas in the reaction of 3-keto compounds with the metal organic compounds, two position-isomers are always formed, which are frequently difficult to separate, the analogous reaction of the 17-keto compounds takes place practically uniformly from a steric point of view so that difficult separations do not arise. When the same hydrocarbon residues ($R^1=R^2$) are to be introduced in 3- and 17-positions, then also the corresponding cyclopentanopolyhydrophenanthrene compounds, which contain a keto group in 3- and 17-position, can be used as starting materials and these simultaneously treated with the metal organic compounds.

The following examples illustrate the invention:

EXAMPLE 1

*3b-methyl-17α-ethinylandrostandiol-(3:17)*

10 grams of potassium are introduced into about ¾ litre of liquid ammonia at about —70 to —60° C. bath temperature and acetylene passed in until the potassium has completely reacted. Then a solution of 10 grams of 3b-methylandrostanol (3)-one(-17) in 150 ccm. of dry ether and 150 ccm. of dry dioxane is allowed to flow in followed by the rinsings from the introduction vessel with a total of about 150 ccm. of dry ether. Then the reaction vessel is taken out of the cold bath and allowed to stand overnight at room temperature. On the following morning, the reaction mixture is treated with 200 ccm. of dioxane and with ice cooling decomposed first with water and then with dilute sulphuric acid. The precipitated crude reaction product is filtered with suction and washed until neutral. After repeated recrystallisation from ethyl acetate, the pure 3b-methyl-17-ethinylandrostandiol-(3:17) melts at 210–211° C., $[\alpha]_D = -30°$ (dioxane).

EXAMPLE 2

3a-methyl-17α-ethinylandrostandiol-(3:17)

In an analogous manner 10 grams of 3a-methyl-androstanol-(3)-ons-(17) are caused to react and the reaction product worked up. After the decomposition with dilute sulphuric acid, the product is extracted with ether and the ether solution washed until neutral, shaken with sodium carbonate solution and again washed until neutral. The dried ether solution is evaporated and the residue remaining is dissolved in warm methanol. After prolonged standing in the cold, the 3a-methyl-17α-ethinylandrostandiol-(3:17) crystallises out. After twice recrystallising from hexane-ether, the substance is obtained pure and melts at 163–164° C., $[α]_D = -29.2°$ (dioxane).

EXAMPLE 3

3a-17α-dimethylandrostandiol-(3:17)

To an ethereal methyl magnesium iodide solution (from 3 grams of magnesium, 10 ccm. of methyl iodide and 100 ccm. of ether) there is added dropwise a solution of 5 grams of 3a-methylandrostanol-(3)-one-(17) in 100 ccm. of ether. The whole is then heated to boiling for a further 1½ hours and the reaction mixture, after cooling to room temperature, decomposed with water and dilute sulphuric acid. By addition of ether, the undissolved fraction of the reaction product is brought into solution and the solution is washed consecutively with water, thiosulphate solution and again with water. From the residue remaining after evaporation of the ether, there is obtained after repeated recrystallisation from acetone, 3a:17α-dimethylandrostandiol-(3:17) of melting point 206–207–208° C.

EXAMPLE 4

3b:17α-dimethylandrostandiol-(3:17)

5 grams of 3b-methylandrostanol-(3)-one-(17) are reacted in an analogous manner with methyl magnesium iodide and the product similarly worked up. From the crude reaction product, after recrystallisation from methanol and ethyl acetate, 3b:17-dimethylandrostandiol-(3:17) of melting point 215–217° C.

We claim:
1. As new compounds, the 3-methyl-17-ethinylandrostandiols-(3,17) of the following formula

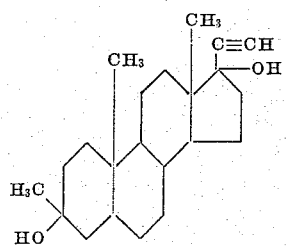

said compounds having a strong inhibitive effect upon the testicle growth of young male animals.

2. As a new compound, 3a-methyl-17α-ethinylandrostandiol-(3,17) having a melting point of about 163–164° C.

3. As a new compound, 3b-methyl-17α-ethinylandrostandiol-(3,17) having a melting point of about 210–211° C.

References Cited in the file of this patent

UNITED STATES PATENTS

| | | |
|---|---|---|
| 2,184,299 | Hildebrandt | Dec. 26, 1939 |
| 2,239,864 | Stavely | Apr. 29, 1941 |
| 2,243,887 | Serini | June 3, 1941 |
| 2,267,257 | Ruzicka | Dec. 23, 1941 |

FOREIGN PATENTS

| | | |
|---|---|---|
| 189,749 | Switzerland | June 1, 1937 |
| 193,541 | Switzerland | Jan. 3, 1938 |
| 193,542 | Switzerland | Jan. 3, 1938 |
| 193,543 | Switzerland | Jan. 3, 1938 |
| 225,926 | Switzerland | June 1, 1943 |

OTHER REFERENCES

Ruzicka: Helv. Chim. Acta 30, 867–78 (1947).
Kumler: Jour. Am. Chem. Soc. 67, 1901–06 (1945).